April 22, 1969  J. NIEDETZKY ETAL  3,440,021
HIGH PRESSURE REACTOR
Filed July 5, 1966
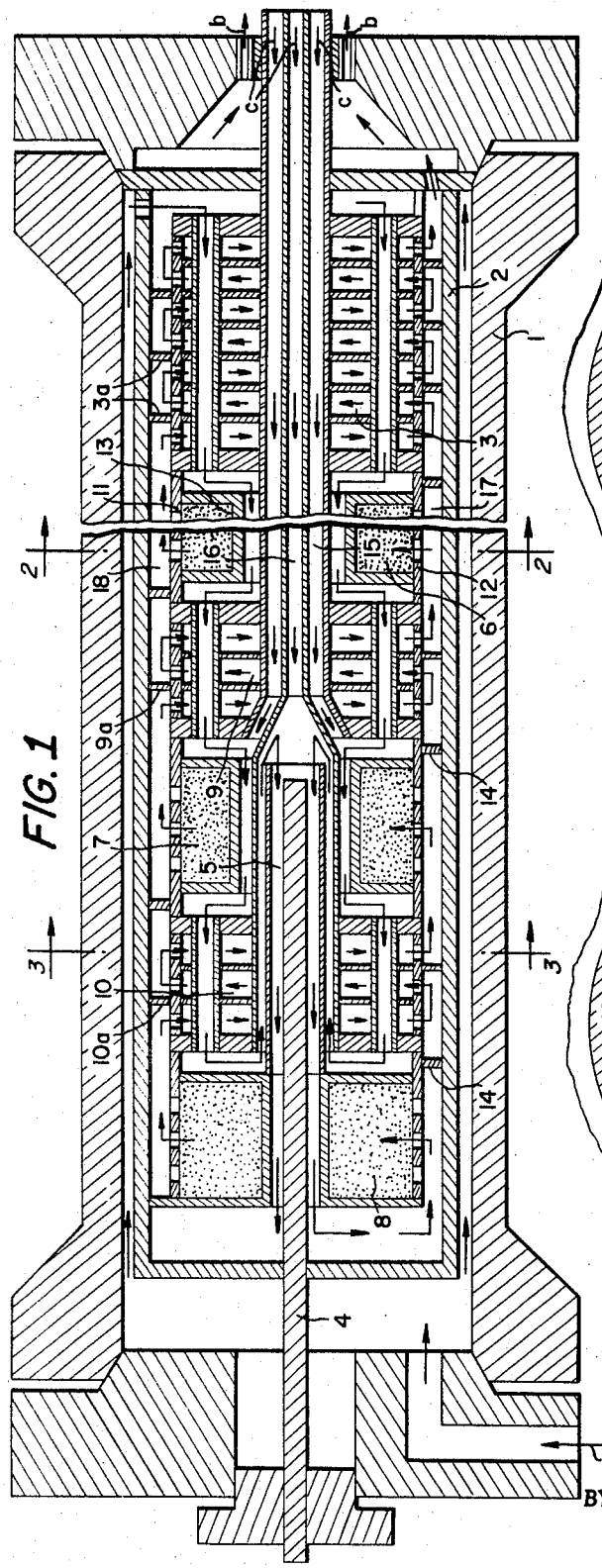
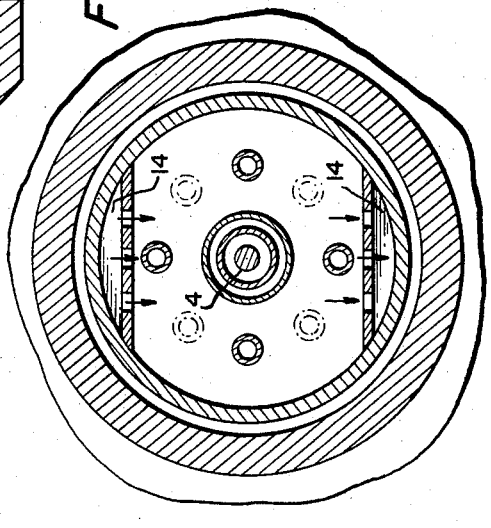
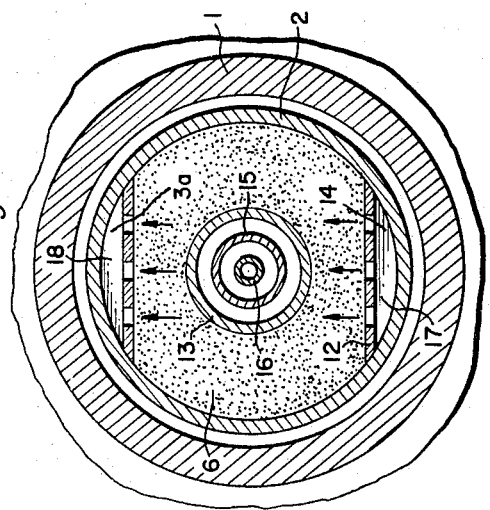
INVENTORS
JOHANN NIEDETZKY
HELMUT HINRICHS
BY Wenderoth, Lind & Ponack.
ATTORNEYS

# United States Patent Office 3,440,021
Patented Apr. 22, 1969

3,440,021
HIGH PRESSURE REACTOR
Johann Niedetzky and Helmut Hinrichs, Linz (Danube), Austria, assignors to Osterreichische Stickstoffwerke Aktiengesellschaft, Linz (Danube), Austria
Filed July 5, 1966, Ser. No. 562,868
Int. Cl. B01j 9/04
U.S. Cl. 23—289          2 Claims

ABSTRACT OF THE DISCLOSURE

A horizontal high pressure reactor with a plurality of alternating catalyst chambers and heat exchangers, having provisions for vertical gas flow through the catalyst.

---

The present invention relates to a high pressure reactor, more especially to a high pressure reactor for the catalytic synthesis of ammonia from nitrogen and hydrogen.

High pressure synthesis reactors for various uses, but particularly for the catalytic synthesis of ammonia from nitrogen and hydrogen, have already been designed, wherein heat exchanger-tube bundles are interposed between two or more contact masses (catalyst layers) which are arranged successively and in spaced relation with respect to each other, in the gas flow path. In such construction, fresh synthesis gas mixture is supplied at the top cover of the high pressure jacket of the reactor, then passes along the space provided between this jacket and an inserted casing (guide tube) which encloses the entirety of the catalyzing interior construction of the reactor down to the lower end of the latter, where it passes through the tubes, inwardly from the exterior, of a per se conventional main heat exchanger, then traverses a central tube to the next heat exchanger-tube bundle with reversal of direction of flow, and so on, until the fresh reaction gas stream reaches the uppermost catalyst layer, heated to incipient reaction temperature by indirect heat exchange in countercurrent to the hot reaction gas. The gas stream, which from this point on is increasingly ammonia-containing, then alternately flows through the individual catalyst layers and through the therebetween-interposed heat exchanger tubes, this time through the interior thereof, the flow being downwardly from above, until the gas with its optimal content of ammonia leaves the reactor through the vertical tubes of the main heat exchanger. This reactor construction makes possible a far-reaching approximation of the theoretically required optimal temperatures, for instance for the synthesis of ammonia, in all parts of the reactor.

The development of the catalytic high pressure synthesis reactors, especially for the manufacture of ammonia from nitrogen and hydrogen, is currently in the direction of increase in size of apparatus. This increase in size is however subject to limits, in so far as the heretofore conventionally upright high pressure reactors are concerned. The present invention is concerned with the improvement and modification of the aforedescribed type of reactor, to enable the latter to be employed in recumbent position.

The heretofore-employed vertical reactors can be operated only in upright position. Operation in the recumbent position necessitates a radically different relationship of the parts if the desired flow of gas mixture through the several catalyst masses is to be achieved.

According to the present invention, the fresh gas is not passed through the catalyst layers in the axial direction but rather in the transverse direction relative to the length of the reactor, that is, with recumbent reactor with horizontal axis, through each catalyst layer downwardly from above and through each following interposed heat exchanger upwardly from below or reversed in the two cases (i.e. upwardly from below through the catalyst layers and downwardly from above through the heat exchangers), the reversal of the gas flow being assured by the provision of baffle plates which are disposed alternately above and below the catalyst layers.

The fresh gas, which initially serves to cool the pressure jacket on the inner side thereof and simultaneously to cool the guide tube on the outer side thereof, traverses the end-positioned main heat exchanger preferably through horizontal cooling tubes thereof, then flows from this main heat exchanger along the outer wall of a centrally disposed cold gas supply tube and along the inner wall of the next catalyst container until it reaches the next interposed heat exchanger and passes through the cooling tubes of the latter, the direction of flow being always toward the opposite end, then passes along the following catalyst container or containers, then enters the first catalyst layer, passes through this in a direction transversely of the axis of the reactor, and then, after reversing its direction of flow, passes around the cooling tubes of the adjacent heat exchanger and so on, until the finally completely reacted gas again passes through the main heat exchanger from which it is discharged to the reactor outlet and passes out to be further worked up.

The aforedescribed type of gas flow guiding in a recumbent reactor can be carried out in a reactor as hereinafter described, with reference to the accompanying drawings wherein:

FIG. 1 is a diagrammatic view of the reactor in longitudinal section;

FIG. 2 is a diagrammatic cross-sectional view along line 2—2 of FIG. 1; and

FIG. 3 is a diagrammatic cross-sectional view along line 3—3 of FIG. 1.

The reactor according to the invention comprises some parts of per se known construction, as for example the pressure member (jacket) 1, the jacket insert (guide tube) 2 which encloses in gastight manner the entire catalyzing device, i.e. the entire catalytic reactor proper, the main heat exchanger 3 and the burner 4 with the burner tube 5. Also the arrangement of the several catalyst layers (catalyst containing chambers) 6, 7 and 8 which are interconnected with each other for flow of gas through the interposed heat exchangers (heat exchanger-tube bundles) 9 and 10 corresponds in principle to the previously described prior arrangement. The number of catalyst layers and of interposed heat exchangers can be varied in number, and the number employed in the here-described reactor is to be regarded solely as illustrative and not limitative in character.

The adaptation of the reactor to the recumbent position is achieved, according to the invention, as shown more especially in FIGS. 1 and 2, by supporting each of the catalyst masses 6, 7 and 8 on a flat perforated or slotted metal sheet or on a suitable grid or netting 11 and by superposing a similar element 12 (perforated or slotted sheet, etc.) on each catalyst mass in such manner that neither below the central opening 13 for the passage of fresh gas from one heat exchanger-bundle of tubes to the succeeding one, nor above the perforated plate 12, can there be formed a hollow space for the free passage of gas in the axial direction. The perforated plates or the like 11, 12 form with the respective adjacent inner wall of the guide tube 2 a hollow space 17, 18, which in cross section has the shape of a segment of a circle and which extends along the entire interior length of the guide tube 2 and serves for the passage of the reaction gas stream from one interposed heat exchanger to the next-following catalyst layer or layers.

The transverse flow of the backward-flowing reaction gas, which starting from the initial catalyst layer 8 has an increasing ammonia content, through the individual heat exchanger-tube bundles 10, 9 and main heat exchanger 3, is achieved with the aid of per se conventional baffle plates 10a, 9a and 3a.

However, in contrast to the previously proposed reactor with alternately arranged catalyst layers and heat exchangers, wherein the reaction gas flows through the individual catalyst layers in the axial direction, it is necessary in the reactor construction according to this invention for the reaction gas to flow through the individual catalyst layers transversely of the axis of the reactor, the gas passing from the top downwardly through the heat exchanger-tube bundles following each catalyst layer. In order to assure this manner of gas flow, additional baffle plates, such as those indicated at 14 in FIG. 1, are provided between the outer wall of the catalyst containers 11,12 and the inner wall of the guide tube 2.

Although the thus-described novel reactor construction is quite sufficient to assure very good control of the operating temperatures of the reactor throughout the several described elements thereof, so that e.g. optimal synthesis of ammonia can be carried out therewith, it is expedient—according to a further aspect of the invention—to provide supplemental means for the fine regulation of the supply of cold fresh gas. This fine regulation is made possible by the provisions of coaxial (concentric) tubes 15 and 16 whereby the cold synthesis gas mixture can be supplied in individually controlled manner separately to the several successively arranged intermediate heat exchangers 9 and 10 and the initial catalyst layer 8.

The burner construction 4 is per se conventional.

Fresh synthesis gas mixture, of e.g. nitrogen and hydrogen, enters at inlet a, and the reacted gas mixture (containing synthesized ammonia) leaves at outlets b. Cold fresh reaction gas mixture can be provided at c in conventionally controlled manner (e.g. via adjustable valves).

The number of cooling tubes in the interposed heat exchangers and, for that matter, in the main heat exchanger can be varied as desired, and this possibility of variation in number is indicated by the broken lines in FIG. 3.

The above-described relationships of parts make it possible to effect the gas synthesis in reactors of any desired size in recumbent disposition, whereby the otherwise necessary provision of extra-heavy foundations and the use of extremely high service cranes are rendered superfluous.

The number and sizes of the described and illustrated catalyst layers and heat exchangers are not limited to those herein disclosed, solely by way of exemplification of the constructional principles of the new gas synthesis reactor.

Having thus disclosed the invention, what is claimed is:

1. A recumbent high pressure reactor for carrying out catalytic gas synthesis, comprising a plurality of separately and successively disposed catalyst-containing chambers and heat exchangers interposed between and separating said chambers from each other, a main heat exchanger at one end of the reactor and a gas heater at the other end, a tubular container for said exchangers and catalyst chambers, means for guiding synthesis gas mixture supplied at the end remote from said main heat exchanger successively through said main heat exchanger and said interposed heat exchangers in countercurrent to hot reacted gas mixture and then successively through the catalyst layers and again through said interposed heat exchangers and finally to a reacted gas outlet, each said catalyst chamber being delineated below by a perforated catalyst-supporting sheet and above by a second perforated sheet whereby gas may flow through said catalyst chambers, said perforated sheets defining a passageway therebetween and said tubular container, which passageway defines in cross-section a segment of a circle, and baffle means provided in said passageway whereby the gas flow from any catalyst chamber is caused to pass through the next succeeding heat exchanger in the reverse direction and the gas flow from any heat exchanger is caused to pass through the next succeeding catalyst chamber with reversal of direction of flow, the flow through the catalyst chambers and thereafter up to discharge from the main heat exchanger being transversely of the axis of the reactor.

2. A reactor according to claim 1, and means in the form of a plurality of centrally arranged concentric cold fresh reaction gas inlet tubes for enabling control of interior temperatures to be achieved, said tubes terminating at spaced points in the interior of the reactor.

References Cited

UNITED STATES PATENTS

| | | | |
|---|---|---|---|
| 2,218,604 | 10/1940 | Dill | 23—288 |
| 2,585,441 | 2/1952 | Cornell et al. | 23—288.9 |

FOREIGN PATENTS

| | | |
|---|---|---|
| 1,142,586 | 1/1963 | Germany. |
| 106,420 | 2/1943 | Sweden. |

JOSEPH SCOVRONEK, *Primary Examiner.*